United States Patent
Fujio (10) Patent No.: US 8,512,642 B2
(45) Date of Patent: Aug. 20, 2013

(54) APPARATUS FOR PRODUCING HARD POLYURETHANE FOAM BY FROTH PROCESS

(75) Inventor: Akihiro Fujio, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 440 days.

(21) Appl. No.: 12/681,804

(22) PCT Filed: Jan. 14, 2009

(86) PCT No.: PCT/JP2009/050375
§ 371 (c)(1),
(2), (4) Date: Apr. 6, 2010

(87) PCT Pub. No.: WO2010/082318
PCT Pub. Date: Jul. 22, 2010

(65) Prior Publication Data
US 2011/0147975 A1    Jun. 23, 2011

(51) Int. Cl.
*B29B 7/76* (2006.01)
*G05D 7/00* (2006.01)
*C08G 18/00* (2006.01)

(52) U.S. Cl.
USPC ........... 422/133; 422/131; 422/105; 422/107; 422/110; 422/111; 422/116; 521/155

(58) Field of Classification Search
USPC ................. 422/131, 133, 105, 107, 110, 111, 422/116; 521/155
See application file for complete search history.

(56) References Cited

U.S. PATENT DOCUMENTS

| 5,472,990 A | * | 12/1995 | Craig et al. ................. 521/155 |
| 5,480,597 A | | 1/1996 | Ishida et al. |
| 2001/0045343 A1 | * | 11/2001 | Bennett et al. ............. 198/495 |

FOREIGN PATENT DOCUMENTS

| JP | 58-219029 | * | 6/1982 |
| JP | 7-96157 | | 4/1995 |
| JP | 2001-121553 A | | 5/2001 |
| JP | 2002-327439 A | | 11/2002 |
| JP | 2003-82050 A | | 3/2003 |
| JP | 2005-119150 A | | 5/2005 |

(Continued)

OTHER PUBLICATIONS

Office Action issued Jun. 26, 2012 in corresponding Japanese Patent Application No. 2007-275437.

(Continued)

*Primary Examiner* — Jill Warden
*Assistant Examiner* — Lessanework Seifu
(74) *Attorney, Agent, or Firm* — Knobbe Martens Olson & Bear LLP (57) ABSTRACT

Provided is an apparatus for producing hard polyurethane foam by a froth process having a foaming agent supply means that quantitatively supplies the inert gas as a foaming agent and a foaming means that discharges a hard polyurethane foam obtained by forming a foaming polyol composition, in which the foaming agent supply means has a pressure-reducing valve that reduces and adjusts the pressure of the inert gas and a needle valve that adjusts the flow rate of the inert gas, the foaming means has a compression cylinder for compressing and supplying the polyol composition, a regulation means that regulates the supply of the inert gas to the foaming means is provided between the foaming means and the foaming agent supply means, and a control means that controls the regulation means by sensing the operation of the compression cylinder is connected to the regulation means.

15 Claims, 4 Drawing Sheets

(56) References Cited

FOREIGN PATENT DOCUMENTS

| | | |
|---|---|---|
| JP | 2005-200484 A | 7/2005 |
| JP | 2006-192720 A | 7/2006 |
| JP | 2006-328232 A | 12/2006 |
| JP | 2007-217560 A | 8/2007 |
| JP | 2007-307728 A | 11/2007 |
| JP | 2007-321095 A | 12/2007 |
| JP | 2008-133364 A | 6/2008 |
| JP | 2009-7530 A | 1/2009 |
| JP | 2009-19103 A | 1/2009 |
| JP | 2009-084480 A | 4/2009 |

OTHER PUBLICATIONS

Office Action dated Feb. 21, 2012 in corresponding Chinese Patent Application No. 200980103596.5.

* cited by examiner

APPARATUS FOR PRODUCING HARD POLYURETHANE FOAM BY FROTH PROCESS

This application is the U.S. National Phase under 35 U.S.C. §371 of International Application PCT/JP2009/050375, filed Jan. 14, 2009.

TECHNICAL FIELD

The present invention relates to an apparatus for producing a hard polyurethane foam in which a hard polyurethane foam layer is formed in a building or a structure by applying on site with a spray foaming method or an injection foaming method.

BACKGROUND ART

A spray foaming method has been well known as a technique of forming a hard polyurethane foam on site as an insulating material on a surface of a base to be insulated such as a roof, a wall surface, and a floor of a building and a structure such as a warehouse, a barn, and tank facilities that require to retain heat. In the spray foaming method, a technique has been known of using an HFC compound such as 1,1,1,2-tetrafluoroethane (HFC-134a) as a foaming agent in place of a chlorofluorocarbon compound that depletes the ozone layer. However, its cost is very high. A spray foaming method has also been known of using carbon dioxide as a low-cost foaming agent (Patent Documents 1, 2, etc.)

A froth pump is used in a method of interlocking the operation of a foaming machine to the supply of HFC-134a gas from a gas cylinder when discharging a hard polyurethane foam from the foaming machine. That is, the interlocking of them is achieved by connecting an arm of the froth pump to a compression cylinder for a polyol composition that is provided in the foaming machine, and the HFC-134a gas and the polyol composition are mixed together by operating the froth pump by the operation of this compression cylinder when the foaming machine discharges the hard polyurethane foam.

However, when carbon dioxide is used as the foaming agent for example, a pump that sends out carbon dioxide is provided in an apparatus that supplies carbon dioxide. Because of this, the froth pump used for interlocking the supply of carbon dioxide to the operation of the foaming machine cannot be used, and there is a problem that the interlocking of them becomes difficult when carbon dioxide is used as the foaming agent.

[Patent Document 1] Japanese Patent Application Laid-Open No. 2002-327439

[Patent Document 2] Japanese Patent Application Laid-Open No. 2003-082050

DISCLOSURE OF THE INVENTION

Problems to be Solved by the Invention

An object of the present invention is to provide an apparatus for producing a hard polyurethane foam by a froth process that is completely free from chlorofluorocarbons, in which the interlocking of a supply of inert gas to the operation of a foaming machine is made to be possible without using the conventional froth pump by using a compressed or liquefied inert gas as a foaming agent as a chlorofluorocarbon substitute and by using facilities that follow High Pressure Gas Safety Law.

Means for Solving the Problems

The present inventors investigated an apparatus for producing a hard polyurethane foam by a froth process to solve the conventional problem points described above. As a result, they found that the object can be accomplished by adopting the following method, and completed the present invention.

That is, in order to solve the above-mentioned problems, the present invention relates to an apparatus for producing a hard polyurethane foam by a froth process, comprising a foaming agent supply means that quantitatively supplies as a foaming agent an inert gas compressed to a predetermined pressure or liquefied and a foaming means that discharges a hard polyurethane foam obtained by forming a foaming polyol composition by mixing the inert gas and a polyol composition and then by mixing the foaming polyol composition with a polyisocyanate component, wherein the foaming agent supply means has a pressure-reducing valve that reduces and adjusts the pressure of the inert gas and a needle valve that adjusts the flow rate of the inert gas, the foaming means has a compression cylinder for compressing and supplying the polyol composition, a regulation means that regulates the supply of the inert gas to the foaming means is provided between the foaming means and the foaming agent supply means, and a control means that controls the regulation means by sensing the operation of the compression cylinder is connected to the regulation means.

When a hard polyurethane foam is discharged from the foaming means, a foaming polyol composition is produced first by mixing an inert gas as the foaming agent and a polyol composition. At this time, the polyol composition is compressed and supplied. However, when the needle valve is set to a normally open state, the gas pressure of the inert gas (the foaming agent) becomes larger than the liquid pressure of the polyol composition. Because of this, the inert gas and the polyol composition are mixed by inserting the inert gas into the polyol composition. On the other hand, when the hard polyurethane foam is not discharged, the liquid pressure of the polyol composition becomes larger than the gas pressure of the inert gas, and therefore, the inert gas cannot be inserted into the polyol composition, and the mixing of the inert gas and the polyol composition is stopped. That is, interlocking of the foaming agent supply means to the foaming means becomes possible by setting the needle valve to a normally open state.

However, with such interlocking system, even when the foaming means stops the discharging of the hard polyurethane foam, the liquid pressure of the polyol composition does not instantaneously become larger than the gas pressure of the inert gas, and it gradually increases. Because of this, the inert gas is continuously inserted into the polyol composition until the liquid pressure of the polyol composition becomes larger than the gas pressure of the inert gas even after the discharging is stopped, and an excessive amount of the inert gas is supplied. As a result, a fluctuation occurs in the mixing ratio of the inert gas and the polyol composition.

In this configuration, the compression cylinder compresses and supplies the polyol composition, and it operates when the hard polyurethane foam is being discharged from the foaming means. On the other hand, a control means senses the operational state of the compression cylinder and regulates the supply of the inert gas to the foaming agent supply means. With this, when the foaming means stops the discharging of the hard polyurethane foam, the supply of the inert gas can be instantaneously stopped. Even when the hard polyurethane foam is being discharged, the amount of the inert gas supplied can be controlled depending on the liquid pressure of the polyol composition, and therefore, stabilization of the flow rate can be attained. That is, with this configuration, it becomes possible to supply the inert gas to the foaming means timely by interlocking the operation of the foaming means to the supply of the inert gas by the foaming agent supply means.

In the apparatus for producing a hard polyurethane foam by a froth process having this configuration, the inert gas is supplied at a lower pressure setting than that of the upstream side by using a pressure-reducing valve. Furthermore, because the flow rate of the inert gas is adjusted by using a needle valve, it becomes possible to quantitatively supply the inert gas in the gas state without pulsating. That is, because the compressed inert gas is quantitatively supplied without pulsating, stable froth foaming becomes possible on site from right after starting an application, and a good applicability can be obtained.

In this configuration, the compressed or liquefied inert gas is used as the foaming agent, and no rapid volume expansion is accompanied when the inert gas is contacted and mixed with the polyol composition when liquid carbon dioxide is used as the foaming agent for example. Therefore, the foaming polyol composition is discharged from the foaming means, the behavior inside is kept from becoming unstable, and the stirring efficiency when stirring the foaming polyol composition and a polyisocyanate component can be significantly improved. As a result, the liquid temperature of the foaming polyol composition can be also kept low, and a decrease of the internal heat generation temperature when foaming the hard polyurethane foam can be attained.

In the above-described configuration, the control means may have a sequencer, and the regulation means has an opening and closing valve, the opening and closing valve is controlled to be in an open state when the foaming means discharges the hard polyurethane foam and the compression cylinder is operating, and the opening and closing valve is controlled to be in a closed state when the foaming means does not discharge the hard polyurethane foam and the compression cylinder is at rest.

In the above-described configuration, it is preferable that the control means has a laser sensor that detects the operational position of the compression cylinder.

BRIEF DESCRIPTION OF THE DRAWINGS

FIG. 4 (a) is an explanatory drawing showing a state in the vicinity of a compression cylinder in a foaming machine 13, and FIG. 4 (b) is a outline drawing schematically showing a plate fixed to the compression cylinder.

| EXPLANATION OF THE REFERENCE NUMERALS | |
|---|---|
| 11 | FOAMING AGENT SUPPLY DEVICE |
| 12 | CYLINDER |
| 13 | FOAMING MACHINE |
| 14 | POLYOL COMPOSITION STORAGE DEVICE |
| 15 | CONTROL MEANS |
| 16 | REGULATION MEANS |
| 17 | ELECTROMAGNETIC VALVE |
| 18 | SEQUENCER |
| 19 | FIRST NEEDLE VALVE |

| -continued | |
|---|---|
| EXPLANATION OF THE REFERENCE NUMERALS | |
| 20 | SECOND NEEDLE VALVE |
| 21 | VALVE |
| 22 | PRESSURE-REDUCING VALVE |
| 23 | PIPE |
| 24 | FLOWMETER |
| 25 | LASER SENSOR |
| 26 | PIPE |
| 27 | PIPE |
| 28 | SHUT-OFF VALVE |
| 29 | CHECK VALVE |
| 30 | COMPRESSION CYLINDER |
| 31 | POLYOL COMPOSITION |
| 32 | PRESSURE-HOLDING VALVE |
| 33 | SAFETY VALVE |
| 34 | CHECK VALVE |
| 35 | U-SHAPED PIPE |
| 36 | PLATE |
| 37 | TEMPERATURE REGULATING DEVICE |
| 39 | PIPE |
| 41 | POLYISOCYANATE STORAGE DEVICE |
| 42 | PIPE |
| 43 | TEMPERATURE REGULATING DEVICE |

BEST MODE FOR CARRYING OUT THE INVENTION

Figure 1:
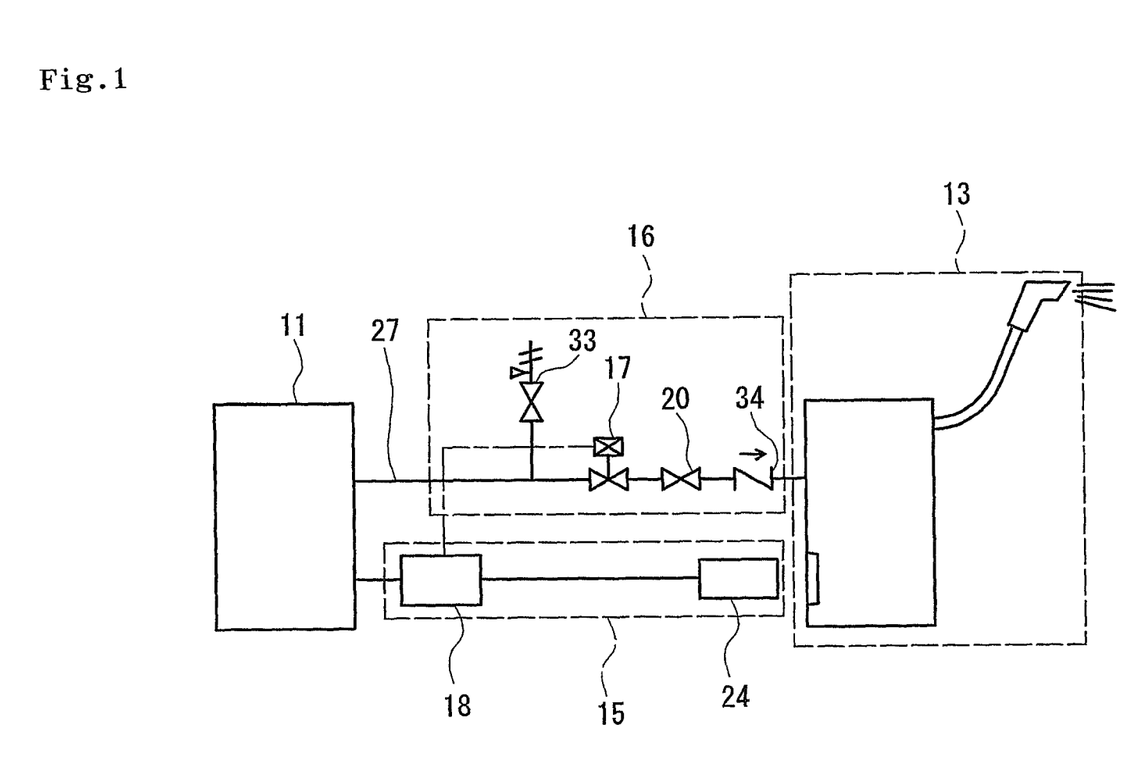
FIG. 1 is a schematic drawing showing a preferred embodiment of an apparatus for producing a hard polyurethane foam according to one embodiment of the present invention.
Figure 2:
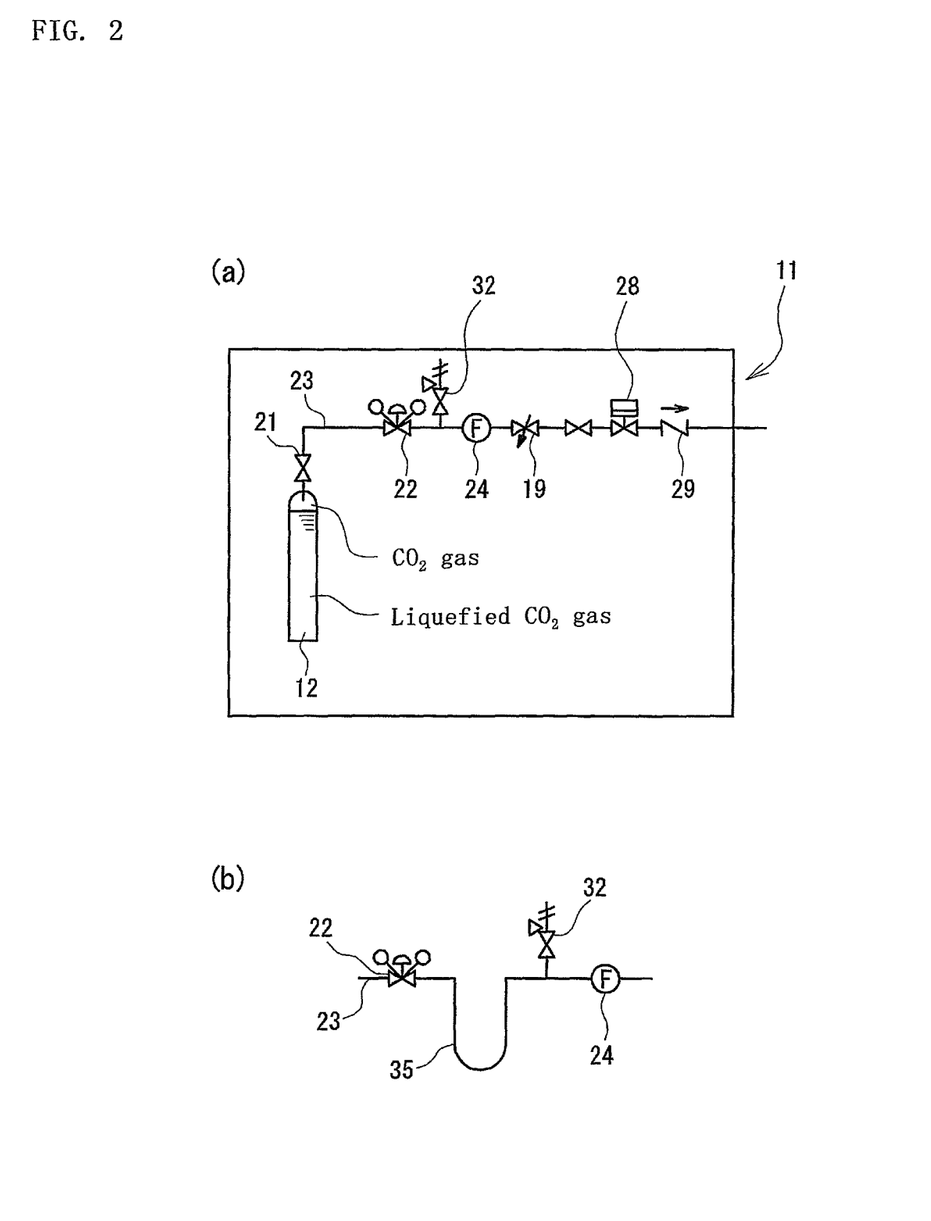
FIG. 2 is a schematic drawing showing a preferred embodiment of a foaming agent supply means of an inert gas in the apparatus for producing a hard polyurethane foam.
Figure 3:
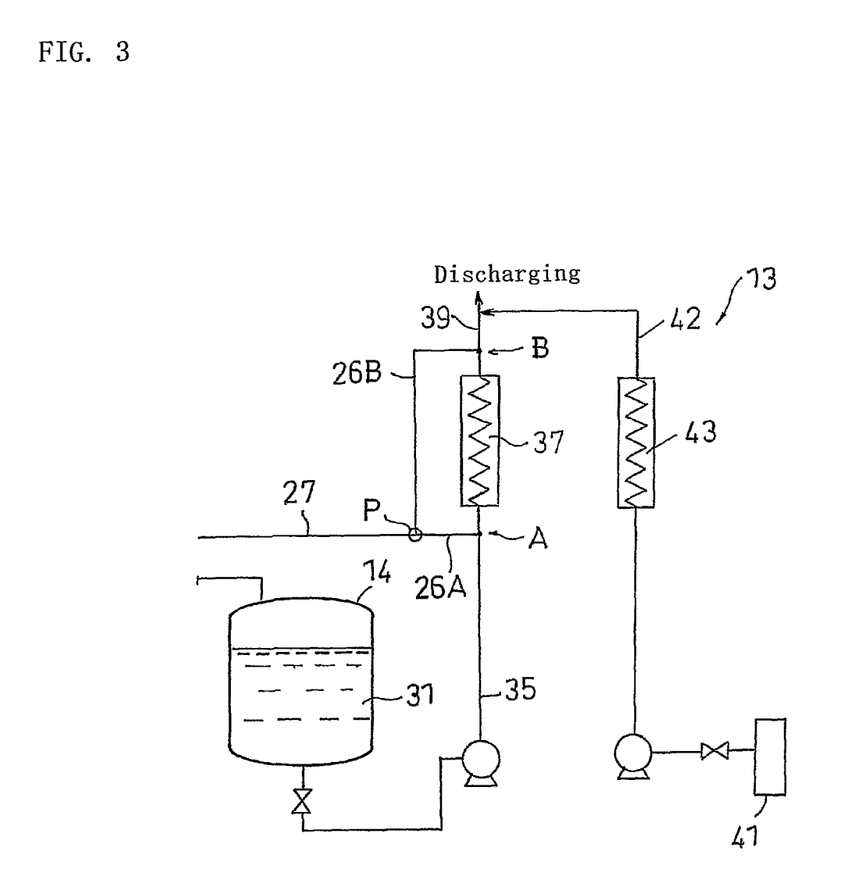
FIG. 3 is a schematic drawing showing a preferred embodiment of a foaming machine in the apparatus for producing a hard polyurethane foam.

The apparatus for producing a hard polyurethane foam of the present invention will be explained. It is described below using carbon dioxide gas as an example of the inert gas. FIG. 1 is a schematic drawing showing a preferred embodiment of the apparatus for producing a hard polyurethane foam according to the present embodiment. FIG. 2 is a schematic drawing showing a preferred embodiment of the foaming agent supply means of an inert gas in the apparatus for producing a hard polyurethane foam. FIG. 3 is a schematic drawing showing a preferred embodiment of a foaming means in the apparatus for producing a hard polyurethane foam.

First, as shown in FIG. 1, the production apparatus according to the present embodiment is equipped with at least a foaming agent supply device (foaming agent supply means) 11 that quantitatively supplies an inert gas as a foaming agent, a foaming machine (foaming means) 13 that discharges the hard polyurethane foam, a control means 15 that controls the supply of the inert gas to the foaming machine 13, and a regulation means 16 that regulates the supply of the foaming agent.

As shown in FIG. 2 (a), the foaming agent supply device 11 is equipped with a cylinder 12 where liquefied carbon dioxide is stored, a pressure-reducing valve 22 that reduces and adjusts the pressure of the inert gas, and a first needle valve 19 that adjusts the flow rate of the inert gas. A siphon tube that reaches to the liquid phase is not provided in the cylinder 12, and only carbon dioxide gas is taken out from the gas phase. The carbon dioxide gas is supplied from the cylinder 12 through a valve 21 and a pipe 23 to the pressure-reducing valve 22 that reduces the pressure of the carbon dioxide gas. The pressure-reducing valve 22 reduces and adjusts the pressure of the downstream side of the carbon dioxide gas to be in the range of 5.5 to 6 MPa when the pressure of the upstream side thereof is 6 to 6.5 MPa. The first needle valve 19 has a function of adjusting the flow rate of the carbon dioxide gas to a predetermined flow rate. A pressure-holding valve 32 that regulates the pressure of the carbon dioxide gas to a constant pressure within the range of 6 to 6.5 MPa and a flowmeter 24 for a high pressure gas that measures the flow rate of the carbon dioxide gas are timely provided between the pressure-reducing valve 22 and the first needle valve 19. A shut-off valve 28 that enables the supply of the carbon dioxide gas timely and a check valve 29 that prevents back flow of the carbon dioxide gas are provided sequentially on the downstream side of the first needle valve 19. With this configuration, the carbon dioxide gas can be quantitatively supplied in a non-pulsating state. The carbon dioxide gas is preferably heated from the pressure-reducing valve 22 to the shut-off valve 28 so that it does not liquefy, and the temperature is preferably set to a range described later. An example of the shut-off valve 28 includes an electromagnetic valve that enables the opening and closing of the valve electrically. Using such an electromagnetic valve, the opening and closing of the shut-off valve 28 can be performed timely by being interlocked to the opening and closing of a gun of an injection device or a spray device for example.

The flowmeter 24 is not particularly limited, and examples that can be used include a bypass capillary heating type thermal mass flowmeter. A gas flow path where the carbon dioxide gas flows and a capillary tube as a bypass flow path that is branched from the main flow path are provided in the thermal mass flowmeter. Thermo-resistors are provided on the upstream side and the downstream side of the capillary tube. A change in the resistance value generated when the carbon dioxide gas flows into the capillary tube in the state that the thermo-resistors are heated while the electric current flows is extracted by a bridge circuit in the control circuit part for driving and controlling the first needle valve 19. Then, the total flow rate is detected from the flow division ratio of the capillary tube to the main flow path based on an electric signal that is output through an amplifier circuit. By comparing this detected value with a set signal from a setting device in which the flow rate value is set in advance in a comparison control circuit, the opening of the first needle valve 19 is driven and controlled so that carbon dioxide gas at the set flow rate value flows in the main flow path.

The pipe between the pressure-reducing valve 22 and the pressure-holding valve 32 may be substituted with a U-shaped pipe 35. The U-shaped pipe 35 can prevent liquefied carbon dioxide from flowing into the pressure-holding valve 32 when the carbon dioxide gas adiabatically expands and liquefies as a result of reducing the pressure of the carbon dioxide gas with the pressure-reducing valve 22

The carbon dioxide discharged from the foaming agent supply device 11 is completely vaporized in a pipe 27 and is sent out in a gas state (not any of a super-critical state, a sub-critical state, or a liquid state). A regulation means 16 that regulates the supply of the carbon dioxide gas into the foaming means is provided in the pipe 27. The regulation means 16 has a configuration in which a safety valve 33, an electromagnetic valve 17 as an opening and closing valve, a second needle valve 20, and a check valve 34 are provided sequentially. Cooling is not performed in the pipe 27.

As shown in FIG. 3, the foaming machine 13 is equipped with a polyol composition storage device 14 and a polyisocyanate storage device 41 that stores a polyisocyanate component. The carbon dioxide gas quantitatively supplied from the foaming agent supply device 11 through the pipe 27 is mixed with a polyol composition 31 in the foaming machine 13. In FIG. 3, the carbon dioxide gas is configured to be able to be mixed with the polyol composition 31 by switching its flow path at a point P with a three-way cock.

In the present invention, the control means 15 shown in FIG. 1 is provided so that the supply of the carbon dioxide gas can be performed timely by being interlocked to the operation of the foaming machine 13. The control means 15 controls the opening and closing operation of the electromagnetic valve 17.

The control means 15 is equipped with a sequencer 18 that directly controls the opening and closing operation of the electromagnetic valve 17 and a laser sensor 25 that detects the operation of the compression cylinder provided in the foaming machine 13. The sequencer 18 brings the electromagnetic valve 17 into an open state when the laser sensor 25 detects the operation of the compression cylinder. When a compression cylinder 33 is detected to be at rest, the sequencer 18 brings the electromagnetic valve 17 into a closed state.

Figure 4:
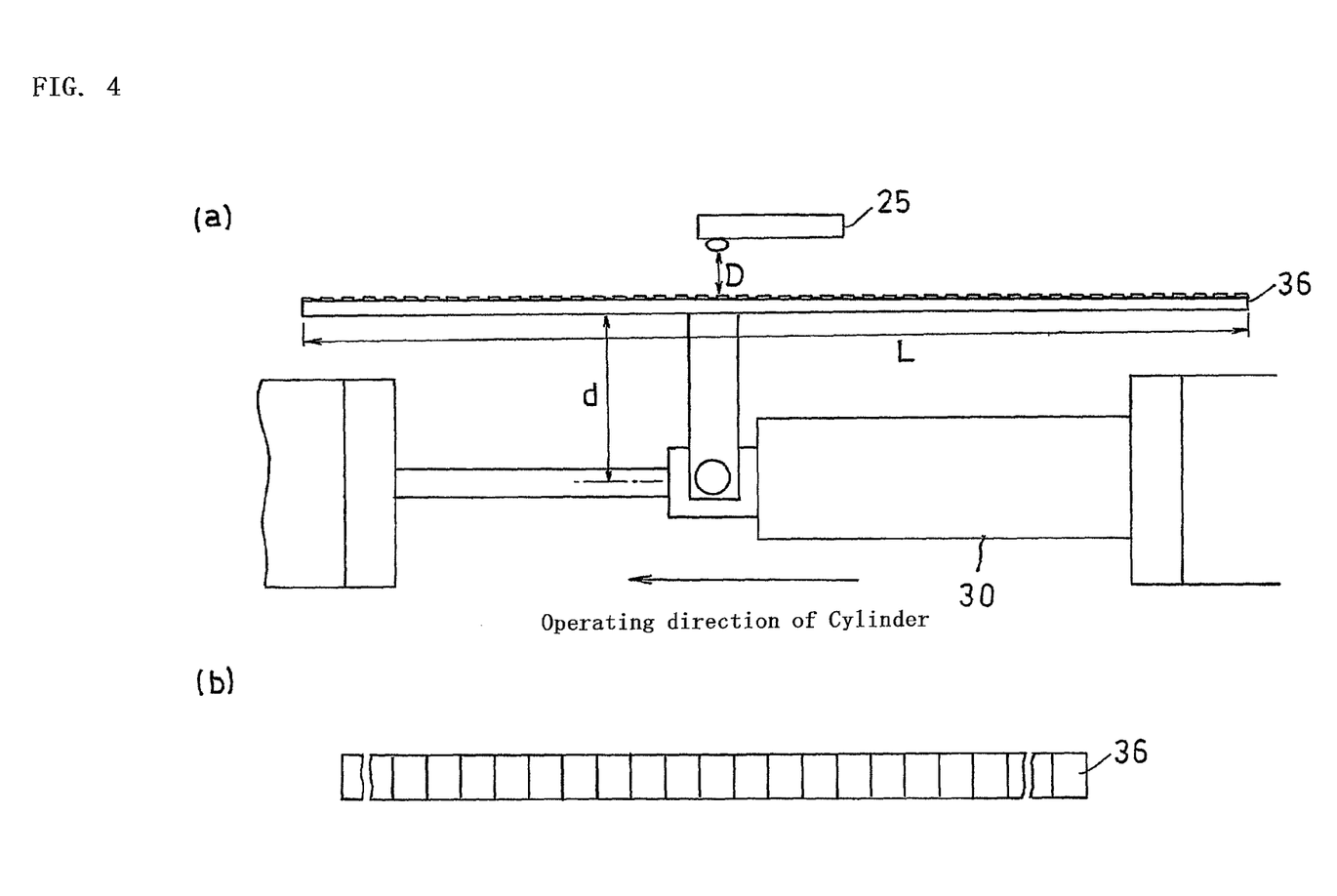

The configuration in the vicinity of the compression cylinder in the foaming machine 13 is shown in FIG. 4 (a). The compression cylinder 33 shown in FIG. 4 (a) is to compress and supply the polyol composition. A plate 36 is provided in the compression cylinder 33 so that the plate 36 becomes parallel to the extending direction of the compression cylinder 33. As shown in FIG. 4 (b), black lines are provided on the surface of the laser sensor 25 side of the plate 36 on a white background at even intervals as shown in FIG. 4 (b). The distance between the black lines is not particularly limited, and it is preferably in the range of 2 to 6 mm for example. The length L of the plate 36 is not particularly limited, and it can be set to 300 mm for example. A distance d between the compression cylinder 33 and the plate 36 is not particularly limited, and it can be set to 50 mm for example. A distance D between the laser sensor 25 and the plate 36 is not particularly limited, and it can be set to 10 mm for example.

The detection of the operation of the compression cylinder 33 by the laser sensor 25 is as follows. That is, when the foaming machine 13 is discharging the hard polyurethane foam, the polyol composition 31 is supplied from the polyol composition storage device 14 to mix the polyol composition 31 with the inert gas that is the foaming agent. At this time, because the polyol composition 31 is compressed to a predetermined pressure and supplied, the compression cylinder 33 performs a reciprocating motion in the left-right direction shown by an arrow in FIG. 4 (a). By interlocking to the reciprocating motion of the compression cylinder 33, the plate 36 fixed to the cylinder 33 also performs a reciprocating motion in the left-right direction shown by the arrow. At this time, the surface of the plate 36 is irradiated with a laser beam from the laser sensor 25, a change is detected in the amount of the received laser beam reflected by the plate 36. The change in the amount of the laser beam received occurs due to the plate 36 on which the black lines are provided at even intervals performing a reciprocating motion in the left-right direction.

When the electromagnetic valve 17 is in the open state and the carbon dioxide gas is supplied to the foaming machine 13 through a pipe 26A, the carbon dioxide gas and the polyol composition 31 are mixed at a junction A to form the foaming polyol composition, and the foaming polyol composition that passes through a temperature regulating device 37 and whose temperature is regulated to a predetermined temperature is sent to an injection device (or a spray device) through a pipe 39. A mixing device such as a static mixer may be provided in the downstream position of the junction A.

When a pipe 26B is used, the carbon dioxide gas and the polyol composition 31 are mixed at a junction B to produce the foaming polyol composition. In this case, after the polyol composition 31 passes through the temperature regulating device 37 and whose temperature is regulated to a predetermined temperature, the polyol composition 31 is mixed with carbon dioxide at the junction B to form the foaming polyol composition, and it is sent to an injection device, etc. through the pipe 39. A hard polyurethane foam by a froth process is formed by discharging and mixing the foaming polyol composition supplied through the pipe 39 with a polyisocyanate component by the injection device, etc. and spraying the mixture onto a base.

The foaming polyol composition is heated before mixing with the polyisocyanate component, and its temperature is adjusted to a predetermined temperature. The heating may be performed for the polyol composition 31 before mixing with carbon dioxide at position B for example, or may be performed at position A in a state of the foaming polyol composition mixed with carbon dioxide. It is more preferable to heat the foaming polyol composition mixed with carbon dioxide at position A from the viewpoint that the stability is excellent during spray foaming. The temperature of the foaming polyol composition is preferably 30° C. or more and 50° C. or less.

The filling pressure of the liquefied carbon dioxide in the gas cylinder 12 is preferably 4 to 6 MPa. The temperature of the liquefied carbon dioxide in the gas cylinder 12 is preferably 6 to 22° C.

The pressure of the carbon dioxide gas from the valve 21 of the gas cylinder 12 to the shut-off valve 28 is good as long as the gas state is maintained. Considering the filling pressure of the gas cylinder 12, the pressure of the carbon dioxide gas is preferably 4 to 7 MPa, and more preferably 4.5 to 6.5 MPa. The heating temperature from the pressure-reducing valve 22 to the shut-off valve 28 is preferably 20 to 45° C., and more preferably 30 to 40° C.

The pressure of the carbon dioxide gas in the pipe 27 is preferably 3 to 5 MPa, and more preferably 3.5 to 4.5 MPa, as described above. The temperature is a temperature at which the gas is completely vaporized, and it is adjusted depending on the pressure. However, it is preferably 14 to 30° C., and more preferably 20 to 30° C. The pressure and the temperature of the carbon dioxide gas in the pipe 27 from the shut-off valve 28 to the junction A are set so that fine gas bubbles of the carbon dioxide gas are formed in the foaming polyol composition. An example of the shut-off valve that can be used includes an electromagnetic valve manufactured by Keihin Co., Ltd.

The temperature of the polyisocyanate component is regulated to a predetermined temperature through a temperature regulating device 43, and the polyisocyanate component is supplied through a pipe 42. The mixing of the foaming polyol composition and the polyisocyanate component is preferably performed especially by stir-mixing with medium-pressure discharge (about 5 to 7 MPa) when foaming on site for example. Examples of the stir-mixing include a helical rotation type stir-mixing and a rotation type stir-mixing with a pin. During the production of the hard polyurethane foam with the apparatus of the present invention, factory production and foaming on site can be performed by using a medium-pressure foaming machine, etc.

The density of the hard polyurethane foam or polyisocyanurate foam (as an insulating material) produced by the production method of the present invention is preferably 50 to 110 kg/m$^3$, and more preferably 55 to 90 kg/m$^3$. The amount of carbon dioxide supplied to achieve such density is preferably 0.3 to 1.5% by weight, and more preferably 0.5 to 1.0% by weight in a foamable stock solution composition (foaming polyol composition+polyisocyanate component).

In the present invention, as the inert gas (gas) used as the foaming agent, an inert gas compressed to a predetermined pressure or one that a liquefied inert gas is made gaseous is used. Examples of the inert gas compressed to a predetermined pressure include nitrogen and rare gas. An example of the one that the liquefied inert gas is made gaseous includes carbon dioxide gas. Examples of the rare gas are helium, neon, argon, krypton, xenon, and radon. Each inert gas exemplified can be used alone or mixed in combination of two or more thereof. Among the inert gases exemplified above, carbon dioxide gas is preferable from the viewpoints that the heat conductivity is relatively low and the handling is easy. Chlorofluorocarbons are excluded from the inert gas of the present invention. The method for producing a hard polyurethane foam of the present invention enables non-chlorofluorocarbon and froth-foaming.

The pressure of the inert gas is preferably 4 to 6.5 MPa right before mixing with the polyol composition when the liquid pressure of the polyol composition is 3.5 to 6 MPa. By making the pressure 6.5 MPa or less, power of discharging the foaming polyol composition from a hose is prevented from becoming too large, and good workability can be secured. On the other hand, by making the pressure of the inert gas 4 MPa or more, deterioration of stirring properties can be prevented and normal foaming can be maintained.

The flow rate of the inert gas is preferably 20 to 70 g/min and more preferably 30 to 50 g/min right before mixing with the polyol composition when the inert gas is $CO_2$ for example. When the flow rate of the inert gas is less than 20 g/min, sufficient foaming is impossible, and therefore, a good foaming body cannot be obtained. On the other hand, when it exceeds 70 g/min, it is not preferable because the foam density decreases and influences physical properties of the foam. The flow rate of the inert gas corresponds to the case that the flow rate of the polyol composition is 2 to 4 kg/min (1 to 1.75 wt %/polyol wt %).

Water is preferably used together with the gas as the foaming agent. The amount of water used is not particularly limited. However, it is preferably 0.5 to 3.5 parts by weight, and more preferably 1 to 2.5 parts by weight relative to 100 parts by weight of the polyol composition. When the amount of water used is less than 0.5 part by weight, the produced amount of carbon dioxide generated by reacting with the polyisocyanate component becomes small, and there is a case that the weight of the obtained foaming synthetic resin cannot be reduced. On the other hand, when the amount of water used exceeds 3.5 parts by weight, the amount of the $CO_2$ gas generated by reaction due to mixing with the polyol composition becomes large, and there is a case that an excessive decrease of the density and deterioration of the strength characteristic of the physical properties of the polyurethane foam occur.

The polyol composition used in the present invention contains a polyol compound, a catalyst, and a foam stabilizer, and contains additives known in the field of polyurethane foam such as a crosslinking agent and a flame retardant depending on necessity. The foaming polyol composition is formed by mixing the compressed inert gas, that is the foaming agent, into the polyol composition.

The liquid temperature of the polyol composition when contacting with the inert gas is preferably 30 to 50° C., and more preferably 35 to 40° C. When it exceeds 50° C., the internal heat generation temperature increases and there is a case that the hard polyurethane foam burns. When the liquid temperature is less than 30° C., there is a case that applicability becomes poor due to excessive delaying of the foaming speed (reactivity), a decrease of stirring efficiency caused by an increase of the viscosity of the stock solution, etc. By making the liquid temperature to be 30 to 40° C., the internal heat generation temperature when foaming the hard polyurethane can be decreased by 15 to 20° C.

A polyol compound such as known polyether polyols and polyester polyols can be used without limitation as the polyol compound for the hard polyurethane foam or the isocyanurate foam. Aliphatic polyether polyol, aliphatic amine polyol, aromatic amine polyol, aromatic polyether polyol, etc. are known and can be used as the polyether polyol compound. The polyol compound may be used alone, or two or more thereof may be used together. The polyol compounds used together may be polyol compounds produced using a single initiator, or those produced by mixing initiators.

Aliphatic polyether polyol is a polyol compound obtained by ring-opening addition of at least one of ethylene oxide and propylene oxide to at least one low molecular weight polyhydric alcohol selected from glycols such as ethylene glycol and 1,4-butanediol, triols such as trimethylolpropane and glycerine, tetrafunctional alcohols such as pentaerythritol, and multifunctional alcohols that are pentafunctional or more such as sorbitol and sucrose, as an initiator.

The hydroxyl value of aliphatic polyether polyol is preferably 50 to 600 mg KOH/g for difunctional and trifunctional polyol compounds, and it is preferably 300 to 600 mg KOH/g for polyol compounds of tetrafunctional or more.

Examples of aliphatic amine polyol are alkylenediamine type polyols and alkanolamine type polyols. These polyol compounds are a multifunctional polyol compound having a terminal hydroxy group obtained by ring-opening addition of at least one cyclic ether such as ethylene oxide and propylene oxide by using alkylenediamine or alkanolamine as an initiator. A known compound can be used as alkylenediamine without limitation. Specifically, alkylenediamine having 2 to 8 carbon atoms can be preferably used such as ethylenediamine, propylenediamine, butylenediamine, hexamethylenediamine, and neopentyldiamine. Among them, alkylenediamine having a small number of carbon atoms is more preferably used, and particularly a polyol compound obtained using ethylenedimaine or propylenediamine as an initiator is preferably used. Examples of alkanolamine are monoethanolamine, diethanolamine, and triethanolamine. The number of functional groups of the polyol compound obtained using alkyleneamine as an initiator is 4, the number of functional groups of the polyol compound obtained using alkanolamine as an initiator is 3, and the number of functional groups for the mixture thereof is 3 to 4. The hydroxyl value of aliphatic amine polyol is preferably 300 to 600 mg KOH/g.

Aromatic polyether polyol is produced in the same manner as the above-described aliphatic polyether polyol using an aromatic compound such as hydroquinone, bisphenol A, and xylylene glycol as an initiator. The hydroxy value of the aromatic polyether polyol is preferably 300 to 600 mg KOH/g.

The aromatic amine polyol is a multifunctional polyether polyol compound having a terminal hydroxy group, obtained by ring-opening addition of at least one cyclic ether such as ethylene oxide and propylene oxide by using aromatic diamine as an initiator. Known aromatic diamine can be used as an initiator without limitation. Specific examples include 2,4-toluenediamine, 2,6-toluenediamine, diethyltoluenediamine, 4,4'-diaminodiphenylmethane, p-phenylenediamine, o-phenylenediamine, and naphthalenediamine. Among them, toluenediamine (2,4-toluenenediamine, 2,6-toluenediamine, or a mixture thereof) is particularly preferably used from the viewpoint that characteristics such as thermal insulation properties and strength of the hard polyurethane foam obtained are excellent. The number of functional groups of the aromatic amine polyol is 4, and the hydroxyl value is preferably 300 to 600 mg KOH/g.

Polyester polyol is constituted from glycol and aromatic dicarboxylic acid. Examples of the glycol are ethylene glycol, 1,2- or 1,3-propylene glycol, 1,4-butanediol, 1,6-hexanediol, neopenthyl glycol, diethylene glycol, triethylene glycol, and polyoxyethylene glycol having an average molecular weight of 150 to 500. Examples of the aromatic dicarboxylic acid include terephthalic acid, isophthalic acid, octophthalic acid, and naphthalenedicarboxylic acid. Such ester polyols can be produced with the same production method as the conventionally generally used ester polyols constituted from aromatic dicarboxylic acid and ethylene glycol or diethylene glycol.

Depending on necessity, low molecular weight polyhydric alcohols used in the technical field of polyurethane can be used as a crosslinking agent that constitutes the polyol composition for the hard polyurethane foam of the present invention. Specific examples include trimethylolpropane, glycerine, pentaerythritol, and triethanolamine.

In the production of the hard polyurethane foam of the present invention, catalysts, flame retardants, coloring agents, antioxidants, and the like known to a person skilled in the art can be used other than the above-described components.

Tertiary amines such as N-alkylpolyalkylenepolyamines, diazabicycloundecene (DBU), N,N-dimethylcyclohexylamine (Polycat-8), triethylenediamine and N-methylmorpholine, and an imidazole derivative are preferably used as the catalyst. A catalyst that forms an isocyanurate bond that contributes improvement of flame retardancy in the structure of the polyurethane molecule is also preferably used, and examples are a fatty acid alkaline metal salt catalyst such as potassium acetate and potassium octylate and a quaternary ammonium salt catalyst.

In the present invention, adding the flame retardant further is also a preferred embodiment, and examples of the preferred flame retardant are organophosphates. The organophosphates are a preferred additive because they act as a plasticizer and therefore have an effect of improving brittleness of the hard polyurethane foam. They have an effect of reducing the viscosity of the polyol composition as well. Halogenated alkylester of phosphoric acid, alkylphosphate, arylphosphate, phosphonate and the like can be used as such organophosphates.

EXAMPLES

<Examples of Producing Hard Polyurethane Foam>

Examples 1 to 3

A hard polyurethane foam by a froth process was produced with a foaming method on site using a commercially available hard polyurethane foamable stock solution on the market (Sofran-R, Polyol 182-100LC1, and Isocyanate S-220NC manufactured by Toyo Tire and Rubber Co., Ltd.) and using apparatus for producing a hard polyurethane foam by a froth process shown in FIGS. 1 to 4. The temperatures of the foaming polyol composition and the polyisocyanate component were regulated to be the same. Solidification of carbon dioxide gas was prevented by heating from the pressure-reducing valve 22 to the shut-off valve 28 in the foaming agent supplying device 11 to about 30 to 40° C. The temperature of the $CO_2$ gas in Table 1 is a temperature at the exit of the foaming agent supplying device 11. The flow rate of the $CO_2$ gas is a value that was measured with the flowmeter 24. The pressure of the $CO_2$ gas is a value right before mixing with the polyol composition. The mixing position of the carbon dioxide gas and the polyol composition was made to be position A.

Comparative Example 1

In Comparative Example 1, a production apparatus in which the foaming agent supply device 11 is directly connected to the foaming machine 13 by the pipe 27 was used neither using the regulation means 16 nor the control means 15 shown in FIG. 1. The needle valve was set to a normally open state, and interlocking of the foaming agent supply device to the foaming machine was attained by the pressure difference between the liquid pressure of the polyol composition and the gas pressure of the carbon dioxide gas. The temperature of the $CO_2$ gas in Table 1 is a temperature at the exit of a non-pulsating constant flow pump. The flow rate of the $CO_2$ gas is a value right after the gas passes the non-pulsating constant flow pump. The gas pressure of the $CO_2$ gas is a value right before mixing with the polyol composition. The mixing position of the carbon dioxide and the polyol composition was made to be position A.

<Evaluation>
(Compressive Strength)
It was measured according to JIS K 7220.
(Applicability)
Whether a predetermined application can be performed or not, when injection foaming, from the beginning of the application was visually evaluated.
<Evaluation Result>

The experimental conditions and the evaluation result are shown in Table 1. From this evaluation result, according to the injection foaming method of the present invention, complete interlocking can be attained by controlling a sequencer of the foaming agent supply device with the foaming machine, and the supply of the carbon dioxide gas can be performed timely according to the fluctuation in the liquid pressure of the polyol composition. As a result, a stable supply of the carbon dioxide gas becomes possible, unevenness of the mixing ratio with the polyol composition can be reduced, and an insulation layer of the hard polyurethane foam having predetermined characteristics can be formed with good applicability. On the contrary, in the comparative example in which the interlocking of the foaming agent supply device with the foaming machine was attained by the pressure difference between the liquid pressure of the polyol composition and the gas pressure of the carbon dioxide gas, the carbon dioxide gas was continuously inserted into the polyol composition for about 5 seconds even after the operation of the foaming machine was stopped. As a result, unevenness in the mixing ratio with the polyol composition occurred, and the applicability deteriorated.

TABLE 1

| | | Example 1 | Example 2 | Example 3 | Comparative Example 1 |
|---|---|---|---|---|---|
| Manufacturing Condition | Foaming agent | $CO_2$ gas | $CO_2$ gas | $CO_2$ gas | $CO_2$ gas |
| | Liquid temperature of polyol composition (° C.) | 38-40 | 38-40 | 38-40 | 38-40 |
| | Liquid pressure of polyol composition (MPa) | 3.5-4.0 | 3.5-4.0 | 3.5-4.0 | 3.5-4.0 |
| | Pressure of $CO_2$ gas cylinder (MPa) | 5.0-6.5 | 5.0-5.6 | 5.0-5.6 | 5.0-5.6 |
| | Amount of $CO_2$ gas (g/min) | 20 | 30 | 40-50 | 30 |
| | Inserting Pressure of Polyol (MPa) | 3.8-4.2 | 3.8-4.2 | 3.8-4.2 | 3.8-4.2 |
| | Setting time of Sequencer (min) | 1-3 | 1-3 | 1-3 | — |
| Evaluation Result | Mixing Position | A | A | A | A |
| | Density (kg/m³) | 81-85 | 74-78 | 67-72 | 59-79 |
| | Compressive Strength (MPa) | 59.0-65.9 | 53.5-59.9 | 49.2-52.4 | 37.6-58.3 |
| | Applicability | good | good | good | Bad |

What is claimed is:

1. An apparatus for producing a hard polyurethane foam by a froth process, comprising a foaming agent supply means that quantitatively supplies as a foaming agent an inert gas compressed to a predetermined pressure or liquefied and
a foaming means that discharges a hard polyurethane foam obtained by forming a foaming polyol composition by mixing the inert gas and a polyol composition and then by mixing the foaming polyol composition with a polyisocyanate component, wherein
the foaming agent supply means has a pressure-reducing valve that reduces and adjusts the pressure of the inert gas and a needle valve that adjusts the flow rate of the inert gas,
the foaming means has a compression cylinder for compressing and supplying the polyol composition,
an opening and closing valve that regulates the supply of the inert gas to the foaming means is provided between the foaming means and the foaming agent supply means, and
a control device equipped with a laser sensor that senses the operation of the compression cylinder and a sequencer that controls an opening and closing operation of the opening and closing valve,
wherein a pressure-holding valve that regulates the pressure of the inert gas to a constant pressure within the range of 6 to 6.5 MPa and a flowmeter that measures the flow rate of the inert as are provided between the pressure-reducing valve and the needle valve.

2. The apparatus for producing a hard polyurethane foam by a froth process according to claim 1, wherein
the control device has a sequencer,
the opening and closing valve is controlled to be in an open state when the foaming means discharges the hard polyurethane foam and the compression cylinder is operating, and
the opening and closing valve is controlled to be in a closed state when the foaming means does not discharge the hard polyurethane foam and the compression cylinder is at rest.

3. The apparatus for producing a hard polyurethane foam by a froth process according to claim 2, wherein the control device has the laser sensor that detects the operational position of the compression cylinder.

4. The apparatus for producing a hard polyurethane foam by a froth process according to claim 1, wherein
the foaming agent supply means is connected to the regulation means by a pipe and
the inert gas discharged from the foaming agent supply means is supplied to the regulation means in a gas state without being cooled in the pipe.

5. The apparatus for producing a hard polyurethane foam by a froth process according to claim 1, wherein the flowmeter is a bypass capillary heating type thermal mass flowmeter.

6. The apparatus for producing a hard polyurethane foam by a froth process according to claim 1, wherein a U-shaped pipe is provided between the pressure-reducing valve and the pressure-holding valve, that prevents the inert gas liquefied due to the reduction of the pressure of the inert gas by the pressure-reducing valve from flowing into the pressure-holding valve.

7. The apparatus for producing a hard polyurethane foam by a froth process according to claim 1, wherein the inert gas is supplied quantitatively in a non-pulsating state by providing a shut-off valve that supplies the inert gas timely and a check valve that prevents back flow of the inert gas sequentially on the downstream side of the needle valve.

8. A froth process for producing a hard polyurethane foam, comprising
   supplying an inert gas compressed to a predetermined pressure or liquefied as a foaming agent;
   adjusting the pressure of the inert gas by adjusting a pressure-reducing valve and adjusting the flow rate of the inert gas by adjusting a needle valve;
   compressing and supplying a polyol composition from a compression cylinder;
   sensing operation of the compression cylinder:
   in response to the sensing of the operation of the compression cylinder, regulating supply of the inert gas;
   mixing the supplied inert gas at the adjusted pressure and flow rate with the polyol composition to form a foaming polyol composition;
   mixing the foaming polyol composition with a polyisocyanate component; and
   discharging a hard polyurethane foam,
      wherein a pressure-holding valve regulates the pressure of the inert gas to a constant pressure within the range of 6 to 6.5 MPa and a flowmeter measures the flow rate of the inert as said pressure-holding valve and flowmeter being provided between the pressure-reducing valve and the needle valve.

9. The froth process according to claim 8, wherein regulating supply of the inert gas comprises opening and closing a valve that is controlled to be in an open state when the hard polyurethane foam is being discharged and the compression cylinder is operating, and controlled to be in a closed state when the hard polyurethane foam is not being discharged and the compression cylinder is at rest.

10. The froth process according to claim 9, wherein the operational position of the compression cylinder is detected by a laser sensor.

11. The froth process according to claim 8, wherein the inert gas is supplied through a pipe without being cooled.

12. The froth process according to claim 8, wherein the flowmeter is a bypass capillary heating type thermal mass flowmeter.

13. The froth process according to claim 8, wherein a U-shaped pipe is provided between the pressure-reducing valve and the pressure-holding valve, that prevents the inert gas liquefied due to the reduction of the pressure of the inert gas by the pressure-reducing valve from flowing into the pressure-holding valve.

14. The froth process according to claim 8, wherein the inert gas is supplied quantitatively in a non-pulsating state by providing a shut-off valve that supplies the inert gas timely and a check valve that prevents back flow of the inert gas sequentially on the downstream side of the needle valve.

15. The froth process according to claim 11, wherein the inert gas is at least one gas selected from the group consisting of carbon dioxide gas, helium, neon, argon, krypton, xenon, and radon.

* * * * *

UNITED STATES PATENT AND TRADEMARK OFFICE
CERTIFICATE OF CORRECTION

PATENT NO.         : 8,512,642 B2                                           Page 1 of 1
APPLICATION NO.    : 12/681804
DATED              : August 20, 2013
INVENTOR(S)        : Fujio It is certified that error appears in the above-identified patent and that said Letters Patent is hereby corrected as shown below:

In the Specification

Column 2 lines 10-24, Delete "a foaming means….the regulation means." and insert the same on Col. 2, Line 9, after "liquefied and" as the continuation of the same paragraph.

Column 5 line 45, Delete "22" and insert --22.--.

Column 9 line 34, Delete "ethylenedimaine" and insert --ethylenediamine--.

Column 9 line 58, Delete "toluenenediamine," and insert --toluenediamine,--.

Column 10 line 1, Delete "neopenthyl" and insert --neopentyl--.

In the Claims

Column 12 line 41, Claim 1, Delete "as" and insert --gas--.

Column 13 line 23, Claim 8, Delete "cylinder:" and insert --cylinder;--.

Column 13 line 35, Claim 8, Delete "as" and insert --gas--.

Signed and Sealed this
Twenty-second Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,512,642 B2
APPLICATION NO. : 12/681804
DATED            : August 20, 2013
INVENTOR(S)      : Akihiro Fujio Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Fifteenth Day of September, 2015

Michelle K. Lee
*Director of the United States Patent and Trademark Office*